United States Patent
Nguyen et al.

(10) Patent No.: US 7,321,597 B2
(45) Date of Patent: Jan. 22, 2008

(54) METHOD AND APPARATUS FOR REMOTE NETWORK MANAGEMENT OVER ETHERNET CONNECTIONS

(75) Inventors: Hung Nguyen, Rohnert Park, CA (US); Edward W. Boyd, Petaluma, CA (US)

(73) Assignee: Jeknouus, Inc., Petaluma, CA (US)

(*) Notice: Subject to any disclaimer, the term of this patent is extended or adjusted under 35 U.S.C. 154(b) by 841 days.

(21) Appl. No.: 10/805,088

(22) Filed: Mar. 18, 2004

(65) Prior Publication Data

US 2005/0207450 A1    Sep. 22, 2005

(51) Int. Cl.
*H04L 12/413*    (2006.01)
*H04J 3/22*    (2006.01)

(52) U.S. Cl. .................. 370/445; 370/465; 370/474
(58) Field of Classification Search ............ None
See application file for complete search history.

(56) References Cited

U.S. PATENT DOCUMENTS

| | | | |
|---|---|---|---|
| 6,333,704 B1 | 12/2001 | Jung et al. ............... 341/58 |
| 6,504,850 B1 * | 1/2003 | Kato et al. ............... 370/465 |
| 6,839,322 B1 * | 1/2005 | Ashwood Smith ........ 370/235 |
| 7,133,376 B2 * | 11/2006 | Olson ....................... 370/320 |
| 2003/0140291 A1 | 7/2003 | Brown et al. ............. 714/724 |
| 2003/0219042 A1 * | 11/2003 | Tosa ......................... 370/540 |
| 2004/0202470 A1 * | 10/2004 | Lim et al. ................. 398/51 |
| 2005/0036524 A1 * | 2/2005 | Wojtowicz ............... 370/537 |
| 2007/0047592 A1 * | 3/2007 | Jorgenson et al. ....... 370/509 |

FOREIGN PATENT DOCUMENTS

EP    1 133 123 A2    9/2001

\* cited by examiner

*Primary Examiner*—Andrew C. Lee
(74) *Attorney, Agent, or Firm*—Park, Vaughan & Fleming LLP; Shun Yao

(57) ABSTRACT

One embodiment of the present invention provides a system that performs remote network management over an Ethernet connection between a local node and a remote node, wherein the Ethernet connection uses x-bit/y-bit (xB/yB) encoding. During operation, the system accepts a local Ethernet bit stream containing x-bit words at the local node. The system forms a second bit stream which carries network management information. The system then selectively encodes the x-bit words from the local Ethernet bit stream into y-bit words according to the bits from the second bit stream, thereby forming a third bit stream comprising y-bit words, wherein the third bit stream carries both information from the Ethernet bit stream and information from the second bit stream. The system then transmits the third bit stream on a physical medium from the local node to the remote node.

36 Claims, 8 Drawing Sheets

METHOD AND APPARATUS FOR REMOTE NETWORK MANAGEMENT OVER ETHERNET CONNECTIONS

BACKGROUND

1. Field of the Invention

The present invention relates to remote network management. More specifically, the present invention relates to a method and apparatus for managing network equipment remotely through an Ethernet connection.

2. Related Art

Because of the rapid proliferation of the Internet and multimedia applications, such as video on demand, modern commercial and residential customers are demanding more communication bandwidth and connectivity. This increasing demand is evident in both variable-bit-rate communications (e.g., data services) and fixed-bit-rate communications (e.g., voice services). Customers typically depend upon local-area-networks (LANs) to provide the connectivity necessary to accommodate a growing number of data applications. Meanwhile, a separate network (e.g., a telephone network) provides services for applications that require higher quality of service (QoS). As the volume of network traffic increases and better network technologies emerge, however, it becomes desirable to merge the two separate networks into one integrated and cost-effective high-speed network.

Among the high-speed LAN technologies available today, Fast Ethernet (100BASE Ethernet) and Gigabit Ethernet (1000BASE Ethernet) are the leading choices. Both of these technologies build upon the existing ubiquitous Ethernet standards. They employ the same protocol stack and the same frame format. For the majority of network users, this means that they can extend their existing network equipment to provide 100 Mbps or gigabit speed at a reasonable cost, without the need to re-educate their network administrators and users, and without the need to invest in new network protocols and related hardware.

However, conventional Ethernet technologies can only accommodate asynchronous, packet-based traffic without QoS support. Consequently, Ethernet generally only provides services for applications that do not have stringent QoS requirements (e.g., Internet applications). Mission-critical applications, such as voice communications and financial transactions, have higher QoS requirements and are typically carried on time division multiplexing (TDM) networks (e.g., telephone networks). Although it is possible to carry both types of traffic on one TDM network, it is not cost effective to do so, because TDM networks usually have limited bandwidth, and the network utilization for data traffic is not very efficient. It is therefore preferable to accommodate these two types of traffic on a single high-speed network cost-effectively.

Fortunately, one can take advantage of the xB/yB encoding scheme in Ethernet to accommodate TDM. Generally, Ethernet frames are encoded with an xB/yB scheme, whereby an x-bit word from user data is translated into a y-bit word before it is transmitted onto the physical medium (y is typically larger than x, e.g., 4B/5B, 8B/10B, etc.). The reason for using xB/yB encoding is to use extra bits to increase the number of transitions between "1"s and "0"s for clock synchronization and/or to reduce polarization and to achieve DC balance (i.e., to ensure that there are approximately the same number of "1"s and "0"s).

Originally, the xB/yB encoding schemes were designed to provide a robust transmission under less-than-ideal conditions. However, advances in transmission technologies, especially in optical transmission technologies, have relieved the burden on the encoding schemes to mitigate transmission impairments. As a result, one may use the built-in redundancy of xB/yB encoding (i.e., the extra (y-x) bits in each word) to carry additional information. Moreover, since on an Ethernet link data is transported in a synchronized, continuous sequence of y-bit words, it is now possible to carry TDM traffic using the overhead bandwidth. Consequently, by taking advantage of the redundancy built in the xB/yB encoding, one can carry both variable-bit-rate data traffic and TDM traffic on the same Ethernet link.

Generally, variable-bit-rate communication channels and TDM communication channels are terminated at different network devices. For example, Ethernet channels carrying data traffic are terminated at Ethernet switches or gateways. TDM channels carrying voice traffic, on the other hand, are typically terminated at line interface units (LIUs). These different network devices usually require separate control/management mechanisms.

It is desirable to eliminate the need for two separate network control/management mechanisms in an integrated network that accommodates both Ethernet data traffic and TDM traffic. Hence, what is needed is a method and apparatus for managing network equipment remotely over Ethernet connections.

SUMMARY

One embodiment of the present invention provides a system that performs remote network management over an Ethernet connection between a local node and a remote node, wherein the Ethernet connection uses x-bit/y-bit (xB/yB) encoding. During operation, the system accepts a local Ethernet bit stream containing x-bit words at the local node. The system forms a second bit stream which carries network management information. The system then selectively encodes the x-bit words from the local Ethernet bit stream into y-bit words according to the bits from the second bit stream, thereby forming a third bit stream comprising y-bit words, wherein the third bit stream carries both information from the Ethernet bit stream and information from the second bit stream. The system then transmits the third bit stream on a physical medium from the local node to the remote node.

In a variation of this embodiment, forming the second bit stream involves time-division multiplexing a control channel and a number of constant bit-rate communication channels. The system also terminates the constant bit-rate communication channels with local line interface units (LIUs) located within the local node and with remote LIUs located within the remote node a remote node.

In a further variation, time-division multiplexing a number of constant bit-rate communication channels involves time-division multiplexing a number of T1, E1, or DS3 channels.

In a further variation, the system stores control information in a local register located within the local node whereby the local register can collect information from, and can issue commands to, the local LIUs through at least one serial peripheral interface (SPI); whereby information stored in the local register can be extracted and transmitted through the control channel to the remote node; and whereby information stored in the local register can be updated with information received through the control channel.

In a further variation, the system stores control information in a remote register located within the remote node whereby the remote register can collect information from, and can issue commands to, the remote LIUs through at least one SPI. In this way, information stored in the remote register can be extracted and transmitted through the control channel to the local node. This allows information stored in the remote register to be updated with information received through the control channel.

In a further variation, the system controls the remote LIUs with a local control processor located within the local node which can access the local register through an SPI. This local control processor writes commands to be communicated to the remote LIUs in the local register and the local control processor collects information which is received through the control channel and which is subsequently stored in the local register.

In a further variation, the system controls the remote LIUs by issuing control commands stored in an erasable programmable read-only memory (EPROM) located within the local node; wherein the control commands are first transferred to the local register prior to being transmitted to the remote node.

In a variation of this embodiment, the Ethernet connection is a 100Base Ethernet connection, and wherein forming the third bit stream comprises encoding 4-bit words into 5-bit words according to the second bit stream.

In a variation of this embodiment, the Ethernet connection is a 100Base Ethernet connection, and forming the third bit stream comprises encoding 8-bit words into 10-bit words according to the second bit stream.

In a variation of this embodiment, the Ethernet connection is a 1000Base Ethernet connection, and forming the third bit stream involves encoding 8-bit words into 10-bit words according to the second bit stream.

In a variation of this embodiment, the system detects whether the remote node has xB/yB demultiplexing capability which enables the remote node to extract the encoded second bit stream.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated).

Access Networks

Figure 1:
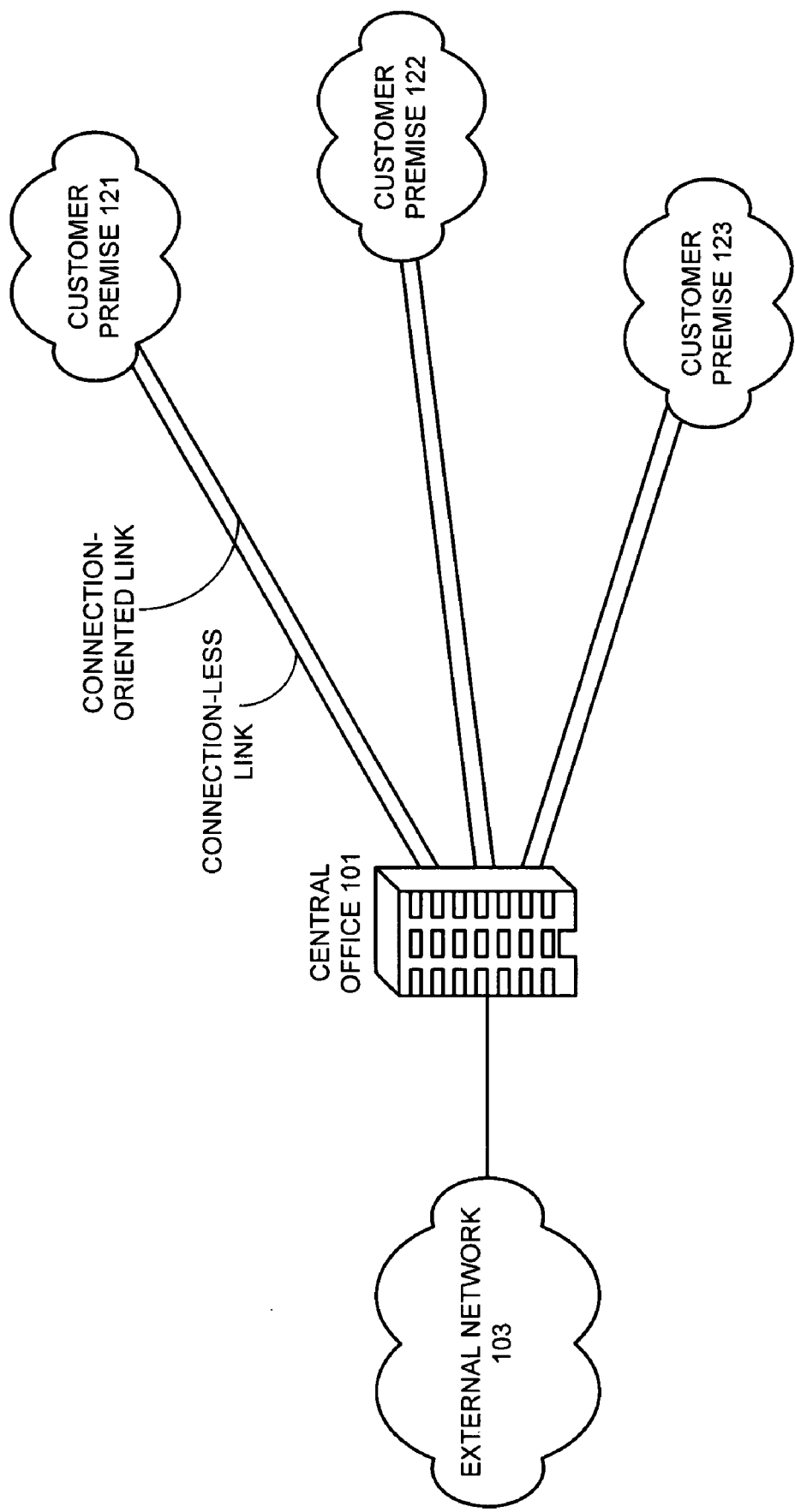
FIG. 1 illustrates an access network wherein a central office provides data services and TDM services through connection-less links and connection-oriented links respectively.

FIG. 1 illustrates an access network wherein a central office provides data services and TDM services through connection-less links and connection-oriented links respectively. A central office 101 provides the access to an external network 103, which may be a metropolitan area network, a public switched telephone network (PSTN), or the Internet.

Conventionally, data services are provided on TDM (telephone) networks. For example, dial-up Internet access and T1/E1 dedicated line Internet access are both carried on telephone networks. These solutions are both expensive and slow. One way to solve this "first mile" bottleneck is to directly provide high-speed Ethernet-based data access to the customers on separate links. These links are independent Ethernet links that are dedicated to connection-less communications. However, since most customer still require traditional connection-oriented, TDM-based services (such as voice services), a separate connection-oriented link is also required.

As shown in FIG. 1, customer premises 121, 122, and 123 may gain access to external network 103 through direct high-speed Ethernet connections. However, separate connection-oriented links are still required to carry TDM traffic.

Network Control/Management

Figure 2:
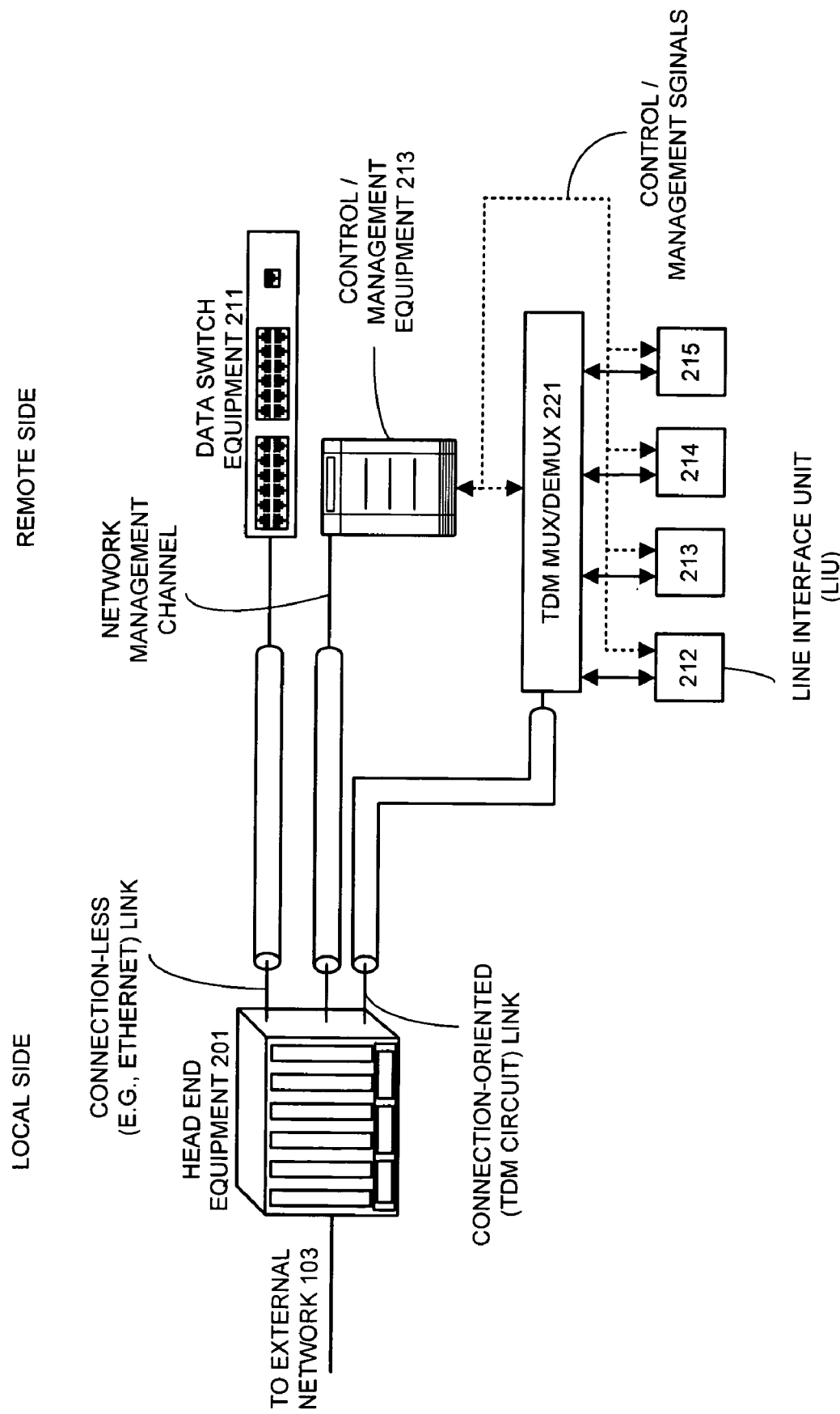
FIG. 2 illustrates separate network control/management for data services and TDM services.

FIG. 2 illustrates separate network control/management for data services and TDM services between a central office and a customer premise. Generally, head end network equipment 201 is located in the central office (local side). Head end equipment 201 may include different equipment for data services and TDM services. Data services are carried on a connection-less (e.g., Ethernet) channel, which on the customer premise is fed into data switch equipment 211 (e.g., an Ethernet switch or an Ethernet gateway).

TDM services are typically carried on a separate, connection-oriented channel. On the remote side, all the TDM circuits are fed into a TDM multiplexer/demultiplexer (MUX/DEMUX) 221, which separates out individual lower-speed TDM circuits. These TDM circuits are in turn terminated at line interface units (LIUs) 212, 213, 214, and 215.

Note that TDM MUX/DEMUX 221 also aggregate TDM circuits in the upstream direction (from customer premise to central office).

Because TDM circuits generally provide guaranteed-QoS services, the corresponding TDM network equipment may need special control/management for monitoring and regulating link health. As shown in FIG. 2, control/management equipment 213 ensures that the TDM equipment functions properly, and all QoS requirement (e.g., bit rate, jitter, etc.) are met. Control/management equipment 213 may report collected link-health statistics information to head end equipment 201, it may also receive instructions therefrom to regulate the behavior of TDM network equipment.

This conventional configuration as illustrated in FIG. 2 requires separate data, TDM, and management channels, it also requires separate control/management equipment. Hence it is not very cost effective and its complexity is relatively high. A more integrated and cost effective solution is more desirable.

Remote Network Management

Figure 3:
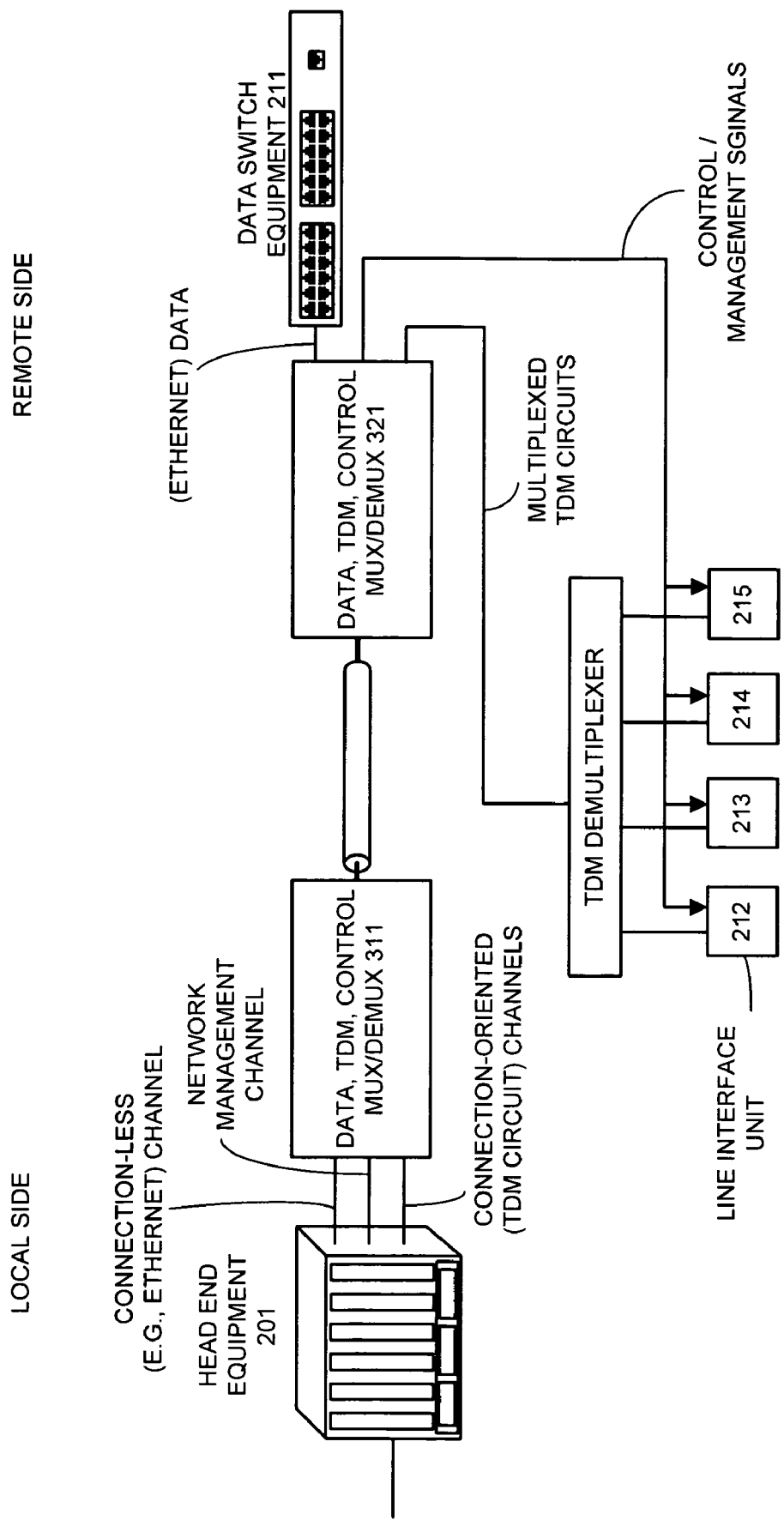
FIG. 3 illustrates remote network control/management of TDM network equipment in accordance to one embodiment of the present invention.

FIG. 3 illustrates remote network control/management of TDM network equipment in accordance to one embodiment of the present invention. From head end equipment 201, the connection-less channel, connection-oriented channel, and network management channel are all merged onto one Ethernet transport medium by MUX/DEMUX 311. MUX/DEMUX 311 takes advantages of Ethernet's xB/yB encoding to transport TDM traffic and network control/management information in the built-in redundant bandwidth. On the remote side, MUX/DEMUX 321 separates the connection-less channel, TDM channel, and network management channel. Note that such configuration works in both downstream direction (from central office to customer premise) and upstream direction (from customer premise to central office).

Note that the network control/management information may include network equipment status information, such as error status, alarm conditions, loss-of-synchronization signals, etc. It may also include configuration instructions for network equipment. For example, it may include instructions to configure an LIU to be in a T1 or E1 mode, to adjust an internal attenuator within an LIU, or to set an LIU to analog or digital loop-back mode.

As illustrated in FIG. 3, by using MUX/DEMUX 311 and 321, one needs only one Ethernet link to carry all three types of traffic (data, TDM, management). More important, one can avoid using separate control/management equipment on the customer premise side by integrating the control/management function inside head end equipment 201, and by communicating the control/management information from the head end equipment to the LIU's. Hence, the cost and complexity of transmission and required equipment on the remote side are significantly reduced.

Figure 4:
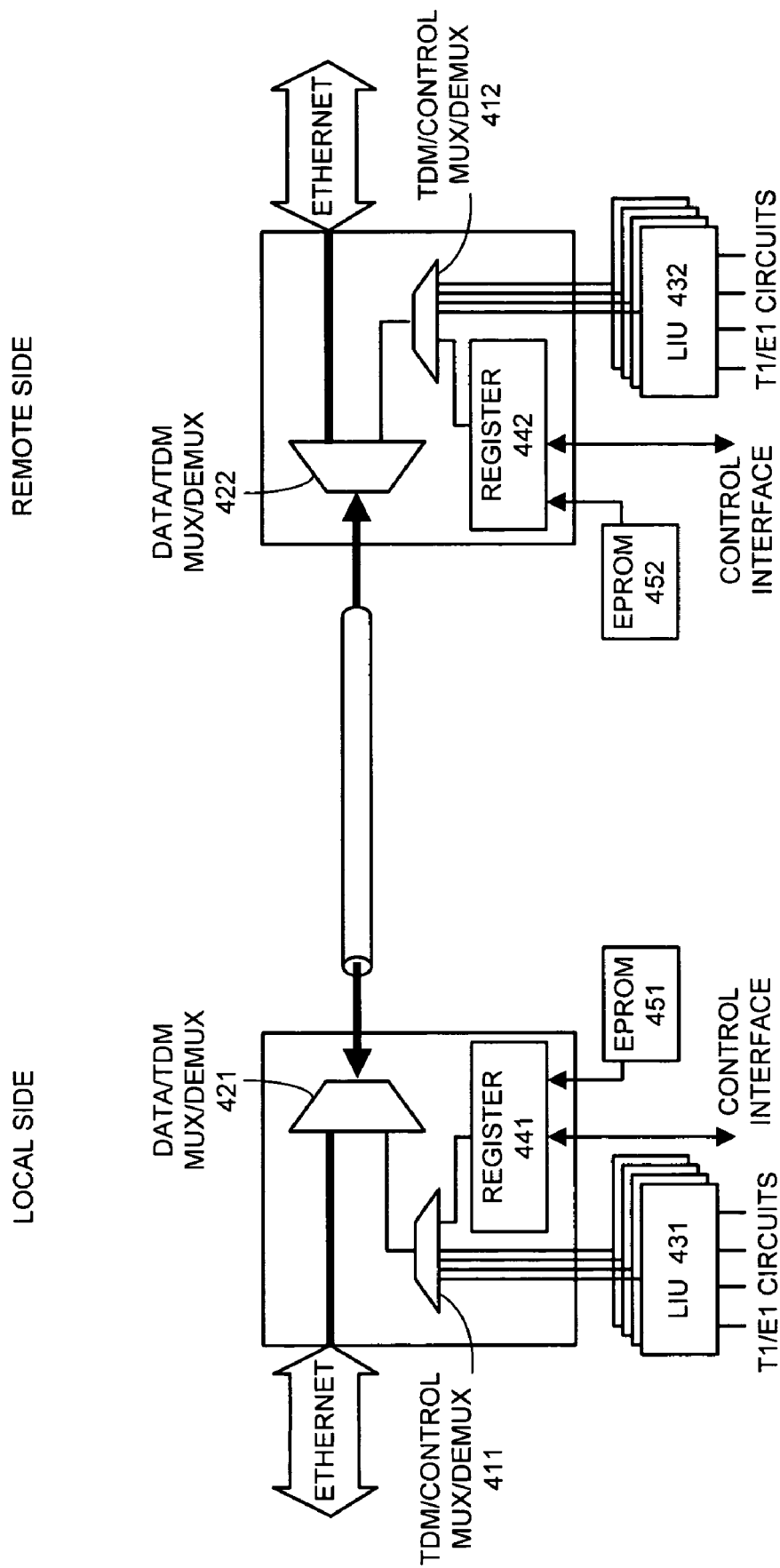
FIG. 4 illustrates configuration of network equipment on local side and remote side in accordance to one embodiment of the present invention.

FIG. 4 illustrates configuration of network equipment on the local side and remote side in accordance to one embodiment of the present invention. On the local side, LIUs, such as LIU 431, collects a number of TDM circuits (e.g., T1/E1 circuits). Register 441 stores control/management instructions for controlling remote network equipment. It can also store received control/management information such as network health data from remote equipment. Register 441 has interfaces through which external network management equipment can access the information stored in register 441 (e.g., write instructions, read collected data, etc.). It may also have an interface with an EPROM 451, which provides pre-stored control/management instructions. These pre-stored instructions in EPROM 451 can initialize remote equipment during boot-up when there is no external network management equipment.

The TDM data and control data stored in register 441 are then multiplexed into one single bit stream by TDM/CONTROL MUX/DEMUX 411. This single bit stream is subsequently multiplexed with an Ethernet channel by Data/TDM MUX/DEMUX 421, which encodes x-bit words in user Ethernet data into y-bit words according to each bit in the bit stream coming from TDM/CONTROL MUX/DEMUX 411.

On the remote side, DATA/TDM MUX/DEMUX 422 first separates the Ethernet data traffic and TDM/Control traffic which is a single bit stream. This bit stream is then fed into TDM/CONTROL MUX/DEMUX 412, and is demultiplexed into control data and TDM circuits. The control data is sent to register 442, which stores received instructions. Register 442 also has control interfaces through which stored instructions can be issued to various network equipment. Register 442 may also have an interface with an EPROM 452, which may contain pre-stored instructions that can be used to locally initialize network equipment. The TDM circuits from TDM/CONTROL MUX/DEMUX 412 are fed to LIUs, such as LIU 432.

Although the above description focuses on the downstream direction (from the local side to the remote side), the same configuration functions similarly in the upstream direction as well.

Figure 5:
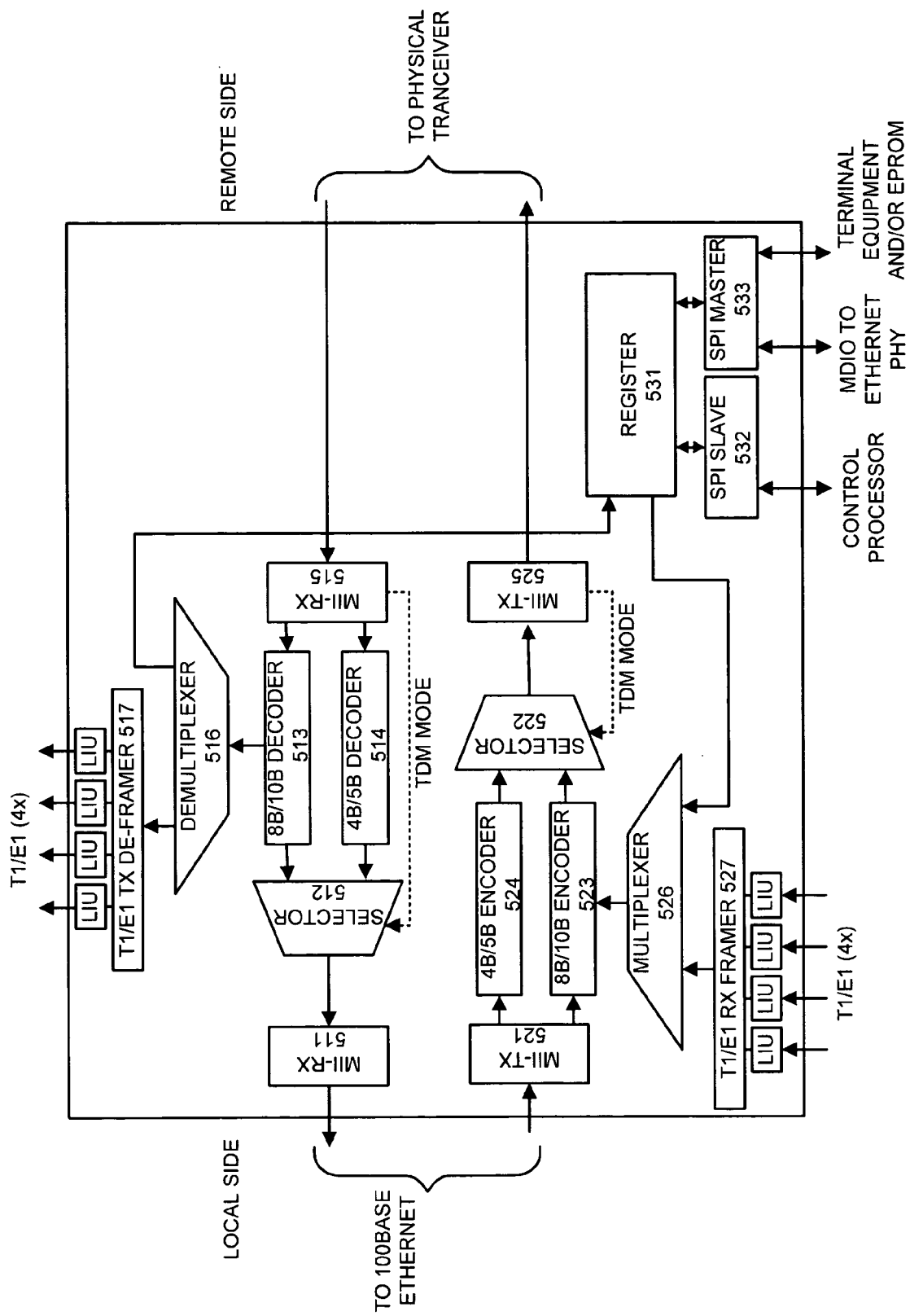
FIG. 5 illustrates a transmitter/receiver board for remote network management over a 100Base Ethernet link in accordance with an embodiment of the present invention.

FIG. 5 illustrates a transmitter/receiver board for remote network management over a 100Base Ethernet link in accordance with an embodiment of the present invention. The lower portion of the figure shows the transmitter part of the board, and the upper portion of the figure shows the receiver part of the board.

The board typically accepts a number of TDM circuits (lower left part of FIG. 5). There are four T1 or E1 circuits in this example. These TDM circuits terminate at their respective LIUs, which feed the bits of each TDM circuit into a T1/E1 RX framer 527. The purpose of T1/E1 RX framer 527 is to time-multiplex the TDM circuits and re-frame the multiplexed data into a single stream of bits.

In the lower right corner of FIG. 5 are two modules that provides access to and from a register 531. Register 531 stores network control/management information. Serial Peripheral Interface (SPI) slave module 532 may provide access to register 531 to an external control processor. SPI master module 533 is used by register 531 to access network devices to be managed, such as TDM circuit LIUs, Ethernet physical layer devices (PHY) (through a management data input/output, MDIO, interface), and an EPROM which has non-volatile pre-stored network management data.

The control/management information stored in register 531, which is ready to be transmitted to a remote node, is sent to a multiplexer 526. Multiplexer 526 multiplexes TDM traffic (output from T1/E1 RX framer 527) and the control/management data from register 531 into a single bit stream, and feeds this bit stream to a special 8B/10B encoder 523.

The special 8B/10B encoder 523 uses a special scheme to encode a regular 8-bit Ethernet word into a 10-bit word, where the choice of the 10-bit word is determined by each bit coming from multiplexer 526. When Ethernet data arrives at the board, the data is received by the local Media Independent Interface (MII)-TX module 521, which concatenates the received 4-bit nibbles into bytes and transfers the bytes to 4B/5B encoder 524 and 8B/10B encoder 523 simultaneously. The reason for using conventional 4B/5B encoder 524 is to ensure the board to be operational when a remote link partner does not have the 8B/10B TDM multiplexing capacity. The selection is accomplished by an auto-sensing process. During the auto-sensing process, MII-TX module 525 transmits a special bit pattern to a remote link partner. If the remote link partner has the same 8B/10B TDM multiplexing capacity, MII-TX module 525 will notify selector 522 to operate in TDM mode and to use 8B/10B encoder 523 for transmission. Otherwise, MII-TX module 525 will notify selector 522 to operate in pass-through mode and to use conventional 4B/5B encoder 524.

On the receiver part of the board, MII-RX module 515 receives the bits arriving from the Ethernet physical medium, and transfers the data to both special 8B/10B decoder 513 and conventional 4B/5B decoder 514. During the auto-sensing process, MII-RX module 515 is responsible for detecting the special bit pattern and determines if the remote link partner has 8B/10B TDM multiplexing capacity. If the remote link partner has the same 8B/10B TDM multiplexing capacity, MII-RX module 515 will notify selector 512 to operate in TDM mode and to use 8B/10B decoder 513 for receiving both Ethernet and TDM-multiplexed data. Otherwise, MII-TX module 515 will notify selector 512 to operate in pass-through mode and to use conventional 4B/5B decoder 514.

The output of selector 512, which contains the decoded Ethernet data, is forwarded to MII-RX module 511 which transmits the Ethernet data onto the local 100Base Ethernet.

When operating in TDM mode, 8B/10B decoder 513 separates the TDM-multiplexed data from the regular Ethernet data. The TDM-multiplexed data (as a single bit stream) is then fed into demultiplexer 516, which further separates the TDM data (i.e., the T1/E1 traffic) from the control data. The control data is sent to register 531 where the control/management information is stored. The TDM data is fed into T1/E1 TX de-framer 517, which de-frames the bit stream and separates individual TDM circuits. These TDM circuits are then transmitted off board by their respective LIUs.

Note that other xB/yB encoding schemes can also be used to multiplex TDM data with regular Ethernet data. For example, items 513 and 523 in FIG. 5 can be special 4B/5B decoder and special 4B/5B encoder, respectively.

Figure 6:
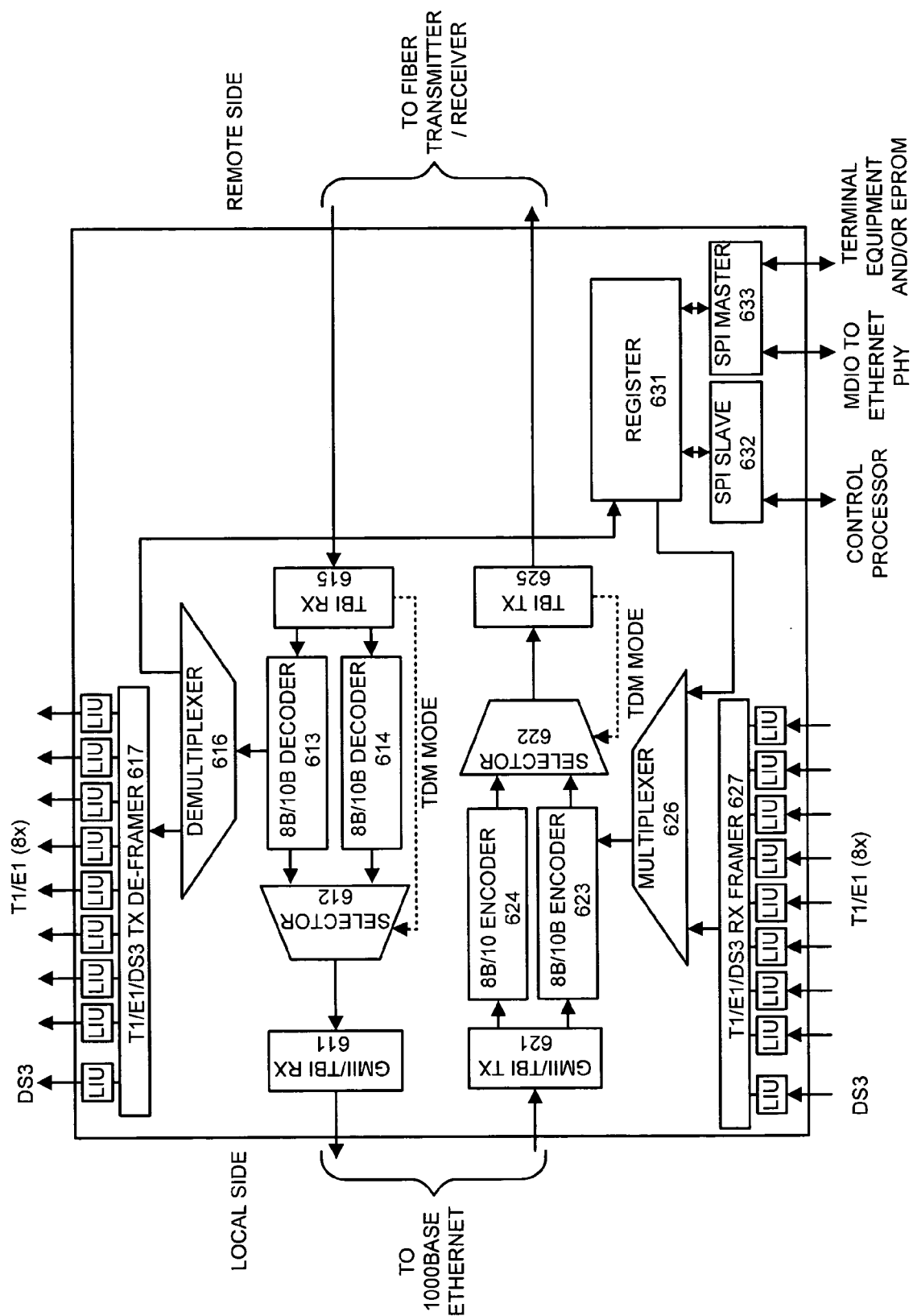
FIG. 6 illustrates a transmitter/receiver board for remote network management over a 1000Base (Gigabit) Ethernet link in accordance with an embodiment of the present invention.

FIG. 6 illustrates a transmitter/receiver board for remote network management over a 1000Base (Gigabit) Ethernet link in accordance with an embodiment of the present invention. The lower portion of the figure shows the transmitter part of the board, and the upper portion of the figure shows the receiver part of the board.

The board typically accepts a number of TDM circuits (lower left part of FIG. 6). There are eight T1 or E1 circuits and one DS3 circuit in this example. These TDM circuits terminate at their respective LIUs, which feed the bits of each TDM circuit into a T1/E1/DS3 RX framer 627. The purpose of T1/E1/DS3 RX framer 627 is to time-multiplex the TDM circuits and re-frame the multiplexed data into a single stream of bits.

In the lower right corner of FIG. 6 are two modules that provide access to and from a register 631. Register 631 stores network control/management information. SPI slave module 632 may provide access to register 631 to external control processor. SPI master module 633 is used by register 631 to access network devices to be managed, such as TDM circuit LIUs, Ethernet PHY (through an MDIO interface), and an EPROM which has non-volatile pre-stored network management data.

The control/management information stored in register 631 which is ready to be transmitted to a remote node is sent to a multiplexer 626. Multiplexer 626 multiplexes TDM traffic (output from T1/E1/DS3 RX framer 627) and the control/management data from register 631 into a single bit stream, and feeds this bit stream to a special 8B/10B encoder 623.

The function of special 8B/10B encoder 623 is to use a special scheme to encode a regular 8-bit Ethernet word into a 10-bit word, where the choice of the 10-bit word is determined by each bit coming from multiplexer 626. When Ethernet data arrives at the board, the data is received by the local Gigabit Media Independent Interface (GMII)-TX module 621, which transfers the bytes to conventional 8B/10B encoder 624 and special 8B/10B encoder 623 simultaneously. The reason for using conventional 8B/10B encoder 624 is to ensure the board to be operational when a remote link partner does not have the 8B/10B TDM multiplexing capacity. The selection is accomplished by an auto-sensing process. During the auto-sensing process, Ethernet ten-bit interface TBI-TX module 625 transmits a special bit pattern to a remote link partner. If the remote link partner has the same 8B/10B TDM multiplexing capacity, TBI-TX module 625 will notify selector 622 to operate in TDM mode and to use special 8B/10B encoder 623 for transmission. Otherwise, TBI-TX module 625 will notify selector 622 to operate in pass-through mode and to use conventional 8B/10B encoder 624.

On the receiver part of the board, TBI-RX module 615 receives the bits arriving from the Ethernet physical medium, and transfers the data to both special 8B/10B decoder 613 and conventional 8B/10B decoder 614. During the auto-sensing process, TBI-RX module 615 is responsible for detecting the special bit pattern and determines if the remote link partner has 8B/10B TDM multiplexing capacity. If the remote link partner has the same 8B/10B TDM multiplexing capacity, TBI-RX module 615 will notify selector 612 to operate in TDM mode and to use special 8B/10B decoder 613 for receiving both Ethernet and TDM-multiplexed data. Otherwise, TBI-TX module 615 will notify selector 612 to operate in pass-through mode and to use conventional 8B/10B decoder 614.

The output of selector 612, which contains the decoded Ethernet data, is forwarded to GMII-RX module 611 which transmits the Ethernet data onto the local 1000Base Ethernet.

When operating in TDM mode, special 8B/10B decoder 613 separates the TDM-multiplexed data from the regular Ethernet data. The TDM-multiplexed data (as a single bit stream) is then fed into demultiplexer 616, which further separates the TDM data (i.e., the T1/E1/DS3 traffic) from the control data. The control data is sent to register 631 where the control/management information is stored. The TDM data is fed into T1/E1/DS3 TX de-framer 617, which de-frames the bit stream and separates individual TDM circuits. These TDM circuits are then transmitted off board by their respective LIUs.

Note that other xB/yB encoding schemes can also be used to multiplex TDM data with regular Ethernet data.

Figure 7:
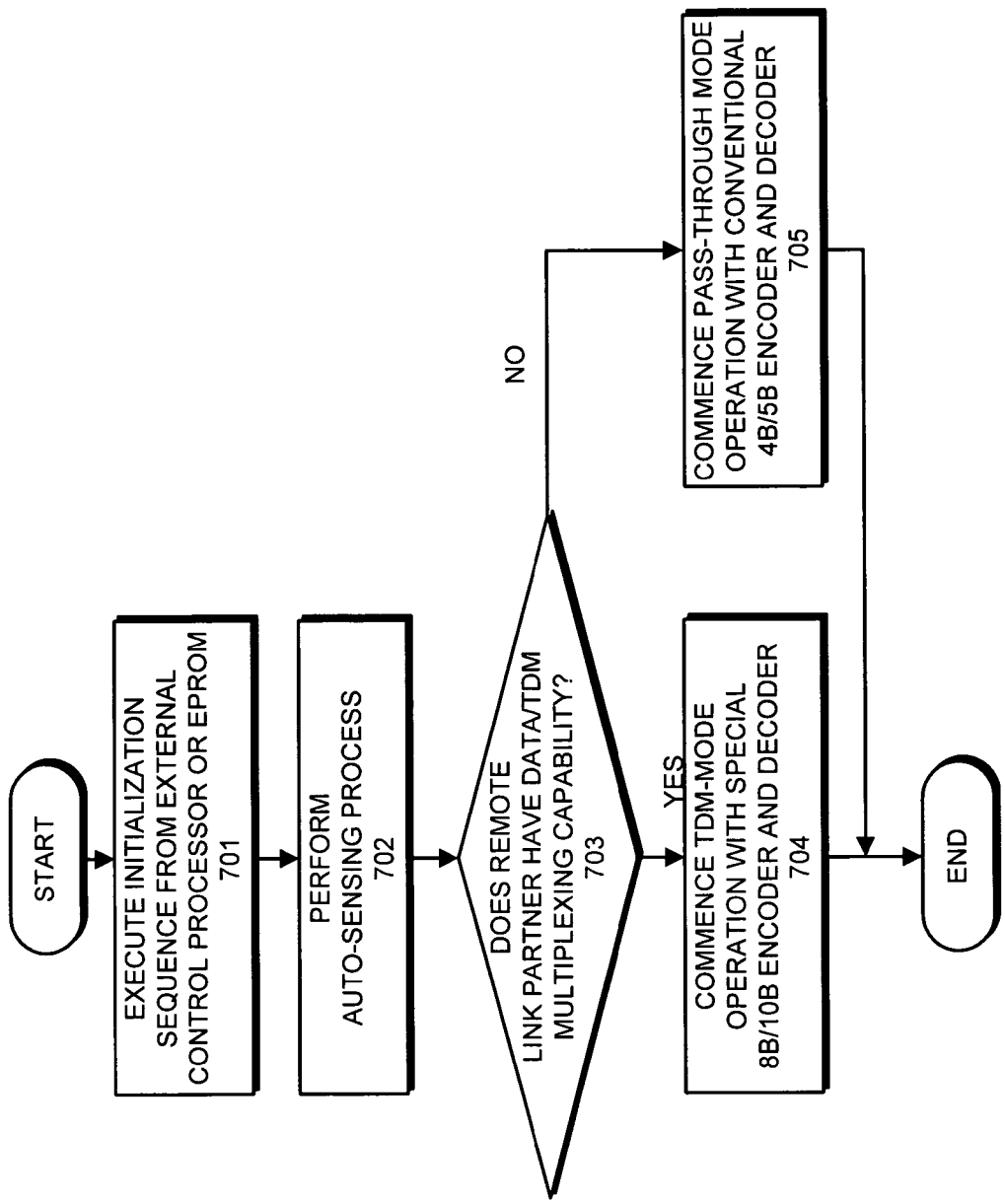
FIG. 7 presents a flow chart illustrating the initialization process for 100Base Ethernet on the central office side in accordance with an embodiment of the present invention.

FIG. 7 presents a flow chart illustrating the initialization process for 100Base Ethernet on the central office side in accordance with an embodiment of the present invention. The system starts by executing an initialization sequence obtained from an external control processor or from an EPROM (step 701). After initialization, the system performs the auto-sensing process (step 702). The system then determines whether its remote link partner has data/TDM multiplexing capability (step 703). If the remote link partner has data/TDM multiplexing capability, the system then commences TDM-mode operation with the special 8B/10B encoder and decoder (step 704). If the remote link partner does not have data/TDM multiplexing capability, the system will commence pass-through mode operation with the conventional 4B/5B encoder and decoder (step 705).

Figure 8:
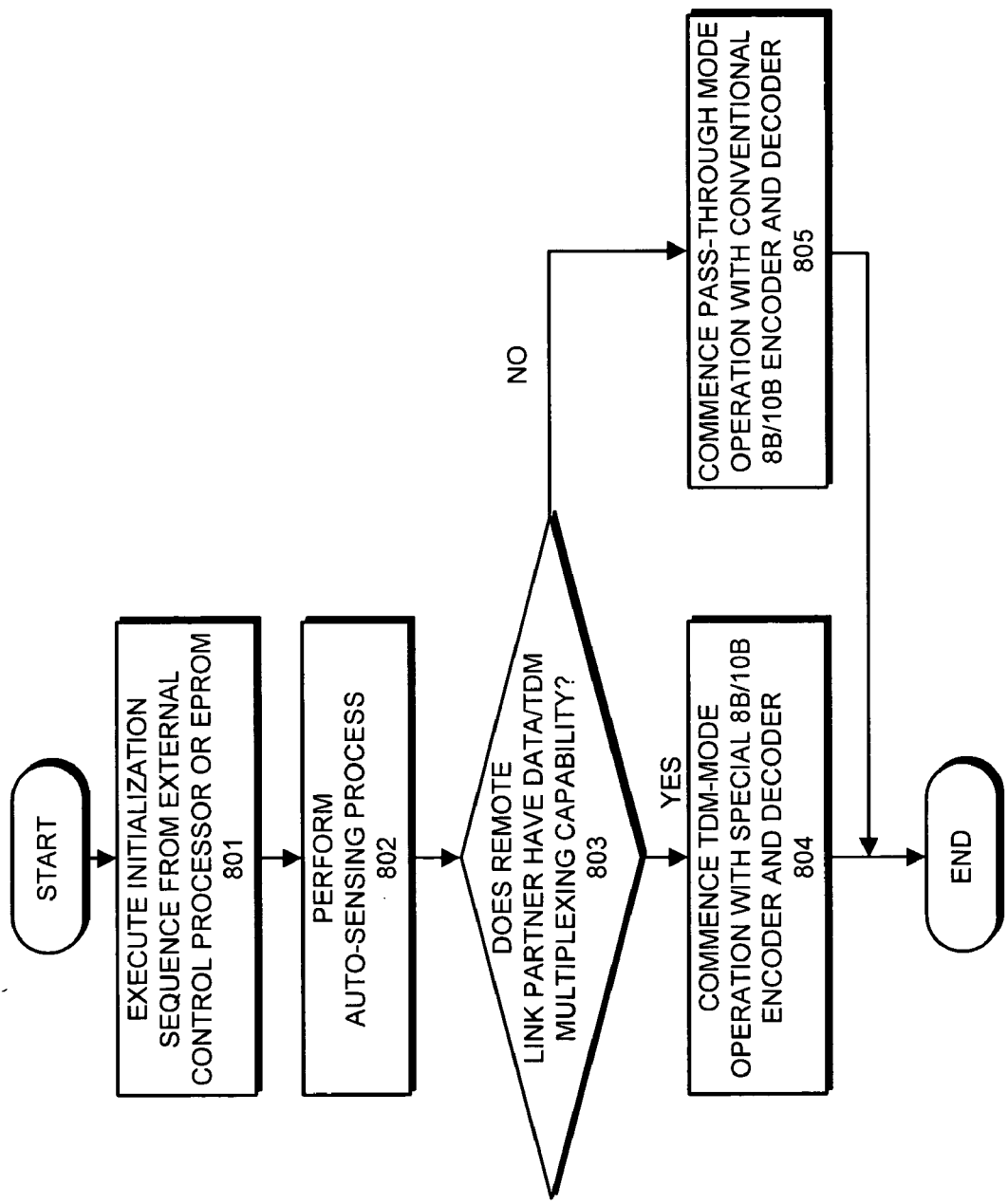
FIG. 8 presents a flow chart illustrating the initialization process for 1000Base (Gigabit) Ethernet on the central office side in accordance with an embodiment of the present invention.

FIG. 8 presents a flow chart illustrating the initialization process for 1000Base (Gigabit) Ethernet on the central office side in accordance with an embodiment of the present invention. The system starts by executing an initialization sequence obtained from an external control processor or from an EPROM (step 801). After initialization, the system performs the auto-sensing process (step 802). The system then determines whether its remote link partner has data/TDM multiplexing capability (step 803). If the remote link partner has data/TDM multiplexing capability, the system commences TDM-mode operation with the special 8B/10B encoder and decoder (step 804). Otherwise, the remote link partner does not have data/TDM multiplexing capability, and the system commences pass-through mode operation with the conventional 8B/10B encoder and decoder (step 805).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing remote network management over an Ethernet connection between a local node and a remote node, wherein the Ethernet connection uses x-bit/y-bit (xB/yB) encoding, the method comprising:
   accepting a local Ethernet bit stream containing x-bit words at the local node;
   forming a second bit stream which carries network control/management information;
   selectively encoding the x-bit words from the local Ethernet bit stream into y-bit words according to the bits from the second bit stream, thereby forming a third bit stream comprising y-bit words, wherein the third bit stream carries both information from the Ethernet bit stream and information from the second bit stream; and
   transmitting the third bit stream on a physical medium from the local node to the remote node.

2. The method of claim 1, wherein forming the second bit stream involves time-division multiplexing a control channel and a number of constant bit-rate communication channels; and
   wherein the method further comprises terminating the constant bit-rate communication channels with local line interface units (LIUs) located within the local node and with remote LIUs located within the remote node.

3. The method of claim 2, wherein time-division multiplexing the number of constant bit-rate communication channels involves time-division multiplexing a number of T1, E1, or DS3 channels.

4. The method of claim 2, further comprising storing control information in a local register located within the local node;
   whereby the local register can collect information from, and can issue commands to, the local LIUs through at least one serial peripheral interface (SPI);
   whereby information stored in the local register can be extracted and transmitted through the control channel to the remote node; and
   whereby information stored in the local register can be updated with information received through the control channel.

5. The method of claim 4, further comprising storing control information in a remote register located within the remote node;
   whereby the remote register can collect information from, and can issue commands to, the remote LIUs through at least one SPI;
   whereby information stored in the remote register can be extracted and transmitted through the control channel to the local node; and
   whereby information stored in the remote register can be updated with information received through the control channel.

6. The method of claim 4, further comprising controlling the remote LIUs with a local control processor which can access the local register through an SPI;
   wherein the local control processor writes commands to be communicated to the remote LIUs in the local register; and
   wherein the local control processor collects information which is received through the control channel and which is subsequently stored in the local register.

7. The method of claim 4, further comprising controlling the remote LIUs by issuing control commands stored in an erasable programmable read-only memory (EPROM) located within the local node;
   wherein the control commands are first transferred to the local register prior to being transmitted to the remote node.

8. The method of claim 1, wherein the Ethernet connection is a 100Base Ethernet connection, and wherein forming the third bit stream involves encoding 4-bit words into 5-bit words according to the second bit stream.

9. The method of claim 1, wherein the Ethernet connection is a 100Base Ethernet connection, and wherein forming the third bit stream involves encoding 8-bit words into 10-bit words according to the second bit stream.

10. The method of claim 1, wherein the Ethernet connection is a 1000Base Ethernet connection, and wherein forming the third bit stream involves encoding 8-bit words into 10-bit words according to the second bit stream.

11. The method of claim 1, further comprising detecting whether the remote node has xB/yB demultiplexing capability through which the remote node can extract the encoded second bit stream.

12. The method of claim 1, wherein forming the second bit stream involves including data-error status, alarm conditions, loss-of-synchronization signals, or instructions to configure an LIU within the second bit stream.

13. An apparatus that performs remote network management over an Ethernet connection between a local node and a remote node, wherein the Ethernet connection uses x-bit/y-bit (xB/yB) encoding, the apparatus comprising:
   a receiving mechanism configured to accept a local Ethernet bit stream containing x-bit words at the local node;
   a multiplexing mechanism configured to form a second bit stream which carries network control/management information;
   an encoder configured to selectively encode the x-bit words from the local Ethernet bit stream into y-bit words according to the bits from the second bit stream, thereby forming a third bit stream comprising y-bit words, wherein the third bit stream carries both information from the Ethernet bit stream and information from the second bit stream; and a transmitting mechanism configured to transmit the third bit stream on a physical medium from the local node to the remote node.

14. The apparatus of claim 13, wherein while forming the second bit stream the encoder is configured to time-division multiplex a control channel and a number of constant bit-rate communication channels; and wherein the local node further includes local LIUs located for terminating the constant bit-rate communication channels at the local node, and wherein the remote node further includes with remote LIUs located for terminating the constant bit-rate communication channels at the remote node.

15. The apparatus of claim 14, wherein while time-division multiplexing the number of constant bit-rate communication channels the encoder is configured to time-division multiplexing a number of T1, E1, or DS3 channels.

16. The apparatus of claim 14, further comprising a local register located within the local node for storing control information;

whereby the local register can collect information from, and can issue commands to, the local LIUs through at least one SPI;

whereby information stored in the local register can be extracted and transmitted through the control channel to the remote node; and whereby information stored in the local register can be updated with information received through the control channel.

17. The apparatus of claim 16, further comprising a remoted register located within the remote node for storing control information;

whereby the remote register can collect information from, and can issue commands to, the remote LIUs through at least one SPI;

whereby information stored in the remote register can be extracted and transmitted through the control channel to the local node; and whereby information stored in the remote register can be updated with information received through the control channel.

18. The apparatus of claim 16, further comprising a local control processor, wherein the local control processor is configured to:

access the local register though an SPI;

control the remote LIUs;

write commands to be communicated to the remote LIUs in the local register; and to collect information which is received through the control channel and which is subsequently stored in the local register.

19. The apparatus of claim 16, further comprising an EPROM located within the local node which stores control commands that can be issued to control the remote node, wherein the control commands are first transferred to the local register prior to being transmitted to the remote node.

20. The apparatus of claim 13, wherein the Ethernet connection is a 100Base Ethernet connection, and wherein while forming the third bit stream the encoder is configured to encode 4-bit words into 5-bit words according to the second bit stream.

21. The apparatus of claim 13, wherein the Ethernet connection is a 100Base Ethernet connection, and wherein while forming the third bit stream the encoder is configured to encode 8-bit words into 10-bit words according to the second bit stream.

22. The apparatus of claim 13, wherein the Ethernet connection is a 1000Base Ethernet connection, and wherein while forming the third bit stream the encoder is configured to encode 8-bit words into 10-bit words according to the second bit stream.

23. The apparatus of claim 13, further comprising an auto-sensing mechanism configured to detect whether the remote node has xB/yB demultiplexing capability through which the remote node can extract the encoded second bit stream.

24. The apparatus of claim 13, wherein the multiplexing mechanism is configured to include data-error status, alarm conditions, loss-of-synchronization signals, or instructions to configure an LIU within the second bit stream.

25. A computer-readable storage medium storing instructions that when executed by a computer cause the computer to perform a method for remote network management over an Ethernet connection between a local node and a remote node, wherein the Ethernet connection uses x-bit/y-bit (xB/yB) encoding, the method comprising:

accepting a local Ethernet bit stream containing x-bit words at the local node;

forming a second bit stream which carries network control/management information;

selectively encoding the x-bit words from the local Ethernet bit stream into y-bit words according to the bits from the second bit stream, thereby forming a third bit stream comprising y-bit words, wherein the third bit stream carries both information from the Ethernet bit stream and information from the second bit stream; and transmitting the third bit stream on a physical medium from the local node to the remote node.

26. The computer-readable storage medium of claim 25, wherein forming the second bit stream involves time-division multiplexing a control channel and a number of constant bit-rate communication channels; and wherein the method further comprises terminating the constant bit-rate communication channels with local LIUs located within the local node and with remote LIUs located within the remote node.

27. The computer-readable storage medium of claim 26, wherein time-division multiplexing the number of constant bit-rate communication channels involves time-division multiplexing a number of T1, E1, or DS3 channels.

28. The computer-readable storage medium of claim 26, where in the method further comprises storing control information in a local register located within the local node;

whereby the local register can collect information from, and can issue commands to, the local LIUs through at least one SPI;

whereby information stored in the local register can be extracted and transmitted through the control channel to the remote node; and whereby information stored in the local register can be updated with information received through the control channel.

29. The computer-readable storage medium of claim 28, wherein the method further comprises storing control information in a remote register located within the remote node;

whereby the remote register can collect information from, and can issue commands to, the remote LIUs through at least one SPI;

whereby information stored in the remote register can be extracted and transmitted through the control channel to the local node; and whereby information stored in the remote register can be updated with information received through the control channel.

30. The computer-readable storage medium of claim 28, wherein the method further comprises controlling the remote LIUs with a local control processor which can access the local register through an SPI;

wherein the local control processor writes commands to be communicated to the remote LIUs in the local register; and wherein the local control processor collects information which is received through the control channel and which is subsequently stored in the local register.

31. The computer-readable storage medium of claim 28, wherein the method further comprises controlling the remote LIUs by issuing control commands stored in an erasable programmable read-only memory (EPROM) located within the local node;

wherein the control commands are first transferred to the local register prior to being transmitted to the remote node.

32. The computer-readable storage medium of claim 25, wherein the Ethernet connection is a 100Base Ethernet connection, and wherein forming the third bit stream involves encoding 4-bit words into 5-bit words according to the second bit stream.

33. The computer-readable storage medium of claim 25, wherein the Ethernet connection is a 100Base Ethernet connection, and wherein forming the third bit stream involves encoding 8-bit words into 10-bit words according to the second bit stream.

34. The computer-readable storage medium of claim 25, wherein the Ethernet connection is a 1000Base Ethernet connection, and wherein forming the third bit stream involves encoding 8-bit words into 10-bit words according to the second bit stream.

35. The computer-readable storage medium of claim 25, wherein the method further comprises detecting whether the remote node has xB/yB demultiplexing capability through which the remote node can extract the encoded second bit stream.

36. The computer-readable storage medium of claim 25, wherein forming the second bit stream involves including data-error status, alarm conditions, loss-of-synchronization signals, or instructions to configure an LIU within the second bit stream.

* * * * *

UNITED STATES PATENT AND TRADEMARK OFFICE
CERTIFICATE OF CORRECTION

| | | |
|---|---|---|
| PATENT NO. | : 7,321,597 B2 | Page 1 of 1 |
| APPLICATION NO. | : 10/805088 | |
| DATED | : January 22, 2008 | |
| INVENTOR(S) | : Hung Nguyen et al. | |

It is certified that error appears in the above-identified patent and that said Letters Patent is hereby corrected as shown below:

On the title page, item [73]:

Assignee: replace "Jeknovus" with --Teknovus--

Signed and Sealed this

Thirteenth Day of May, 2008

JON W. DUDAS
*Director of the United States Patent and Trademark Office*